G. A. JOHNSON.
FRICTION GEAR FOR RAILWAY CARS.
APPLICATION FILED DEC. 26, 1916.
1,301,944.
Patented Apr. 29, 1919.
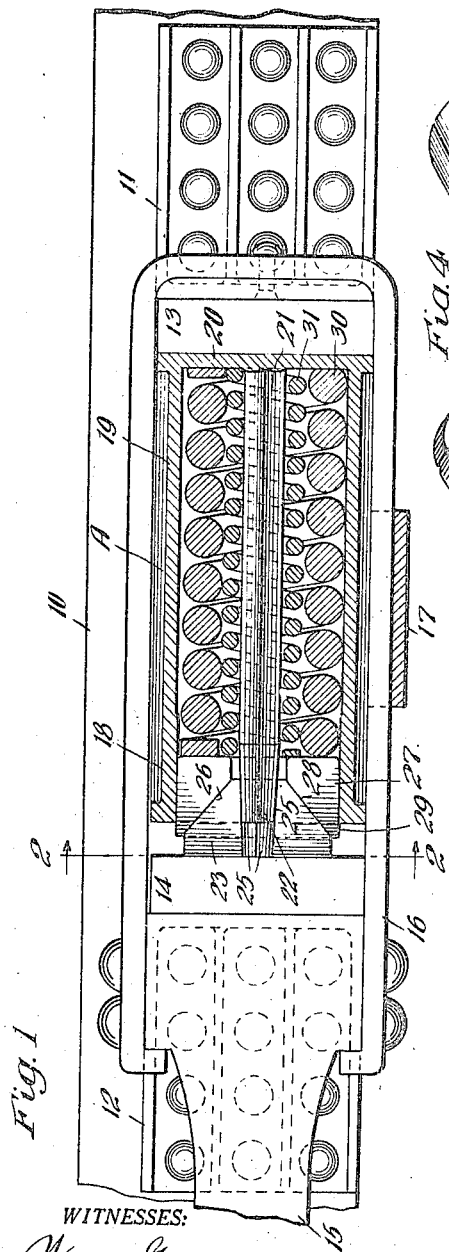
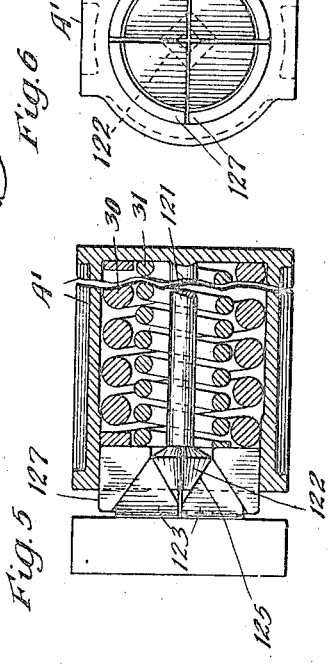
WITNESSES:
Wm. Geiger
Goldie A. Bishop
INVENTOR.
George A. Johnson
BY George H. Haight
His ATTORNEY

UNITED STATES PATENT OFFICE.

GEORGE A. JOHNSON, OF CHICAGO, ILLINOIS, ASSIGNOR TO WILLIAM H. MINER, OF CHAZY, NEW YORK.

FRICTION-GEAR FOR RAILWAY-CARS.

1,301,944.                Specification of Letters Patent.    Patented Apr. 29, 1919.

Application filed December 26, 1916. Serial No. 138,795.

*To all whom it may concern:*

Be it known that I, GEORGE A. JOHNSON, a citizen of the United States, residing at Chicago, in the county of Cook and State of Illinois, have invented a certain new and useful Improvement in Friction-Gears for Railway-Cars, of which the following is a full, clear, concise, and exact description, reference being had to the accompanying drawings, forming a part of this specification.

This invention relates to improvements in friction gears for railway cars.

The object of the invention is to provide a friction gear consisting of few parts capable of being relatively cheaply manufactured and so arranged as to provide high capacity and having a certain release.

In the drawing forming a part of this specification, Figure 1 is a part elevation, part longitudinal section of a draft rigging showing my improvements in connection therewith. Fig. 2 is a transverse, vertical sectional view taken substantially on the line 2—2 of Fig. 1. Fig. 3 is a detail perspective of one of the sets of friction shoes. Fig. 4 is a detail perspective of the other set of friction shoes employed in the invention. Fig. 5 is a sectional view similar to Fig. 1, illustrating a different embodiment of the invention. And Fig. 6 is an end elevation of the form of gear illustrated in Fig. 5.

In said drawing, referring to the type of gear illustrated in Figs. 1, 2, 3 and 4, 10—10 denote center or draft sills to which are secured rear stops 11 and front stops 12. Coöperating with said stops are rear follower 13 and front follower 14. The draw bar 15 is operatively connected to the friction gear, hereinafter described, by a yoke 16 and all the parts are held in suitable position by means of a saddle plate 17.

The improved friction gear proper, as shown, comprises a preferably cylindrical casting A having integral friction shell 18 proper, spring case 19 and rear wall 20. Extending forwardly from the wall 20 from the center of the latter and formed integrally therewith is a friction post 21 tapered at its forward end as indicated at 22. As shown in Fig. 2, the post 21 is rectangular in cross section and adapted to coöperate therewith is a series of friction shoes 23—23, four in number and each having a longitudinal surface 25 along its inner face to engage the corresponding tapered or inclined face of the end 22 of the post. Each of the shoes 23 is provided on its exterior, at its inner end with a conical wedging face 26. Surrounding the series of friction shoes 23 is another series of friction shoes 27—27. Each of the latter is provided on its interior with a conical wedge face 28 engaging the corresponding wedge face 26 and on its exterior, each shoe 27 is provided with a cylindrical friction surface 29 which engages the interior cylindrical friction surface of the shell 18. As clearly appears from Fig. 1, pressure is transferred from the follower 14 to the series of friction shoes 23 in lines parallel to the axis of the gear and the other series of friction shoes 27 is located at the inner end of the series of shoes 23. The series of shoes 27 is resisted in its longitudinal movements by the spring of the gear which, as shown, comprises an outer coil 30 and an inner, lighter coil 31.

In operation, upon inward movement of the draw bar, the pressure is applied to the shoes 23 and as the latter move longitudinally and inwardly of the casting A, said shoes are forced outwardly or radially due to traveling along the tapered portion 22 of the post. As the shoes 23 thus travel, the outer series of friction shoes 27 not only are forced longitudinally within the friction shell, but are compelled to travel at a faster rate than the friction shoes 23, due to the radial movement of the latter while traveling along the tapered portion 22 of the post. Upon removal of the pressure from the shoes 23, it is apparent that the gear will readily release due to the taper on the post 21 since any outward movement of the shoes 23 will disengage the latter from tight frictional engagement with the tapered portion 22 of the post. From the preceding description, it will be seen that I am enabled to obtain a gear of high capacity since I can employ a relatively acute angle between the shoes 23 and the tapered portion of the post and at the same time secure a ready and certain release.

In the construction illustrated in Figs. 5 and 6, the casting A' is made similar to the casting A except that the center post 121 thereof is provided at its forward end with a tapered enlargement 122 having a much blunter angle with respect to the axis of the gear than the angle of the faces of the tapered portion 22 with the axis of the gear shown in the other figures. The friction shoes 123 are made with their interior faces 125 to correspond with the blunter angle on the head 122. Coöperating with the friction shoes 123 is the outer series of friction shoes 127 which also engage the interior cylindrical friction surface of the shell. A spring consisting of two coils 30 and 31 is confined within the spring case to resist movements of the friction elements. The operation will be understood from the preceding description given in connection with the other form of device.

Although I have herein shown and described what I now consider the preferred embodiment of the invention, the same is merely illustrative and I contemplate all changes and modifications that come within the scope of the claims appended hereto.

I claim:

1. In a friction gear, the combination with a friction shell, of a friction post mounted within the shell, the distance between the surfaces of the friction post and friction shell gradually decreasing from the outer ends of the shell and post toward the inner ends thereof, a series of friction shoes disposed around said post and longitudinally slidable on the latter, a series of friction shoes surrounding the first named series of shoes and having direct wedging contact therewith and engaging the shell, and spring means for resisting movement of said shoes.

2. In a friction shell, of a friction post extending axially of said shell and having a tapered outer end, a plurality of friction shoes longitudinally slidable on said tapered end of the post and having exterior wedge faces, a plurality of friction shoes engaging the friction shell and having coöperating wedge faces, and spring means resisting movement of the shoes.

In witness that I claim the foregoing I have hereunto subscribed my name this 22d day of Dec. 1916.

GEORGE A. JOHNSON.